US006680355B1

(12) United States Patent
Weingart et al.

(10) Patent No.: US 6,680,355 B1
(45) Date of Patent: Jan. 20, 2004

(54) DISPERSANT

(75) Inventors: Franz Weingart, Leimen (DE); Roman Benedikt Raether, Limburgerhof (DE); Stephan Bauer, Hochdorf-Assenheim (DE); Ulrike Hees, Mannheim (DE); Manfred Mielke, Heidelberg (DE); Ulrike Schlösser, Neustadt (DE); Rüdiger Sens, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/786,360

(22) PCT Filed: Sep. 17, 1999

(86) PCT No.: PCT/EP99/06915

§ 371 (c)(1),
(2), (4) Date: Apr. 24, 2001

(87) PCT Pub. No.: WO00/17250

PCT Pub. Date: Mar. 30, 2000

(30) Foreign Application Priority Data

Sep. 18, 1998 (DE) .......................................... 198 42 952

(51) Int. Cl.[7] .............................. C08J 3/00; C08K 3/20; C08L 75/00; C08G 18/00; C08G 18/32
(52) U.S. Cl. ................. 524/589; 106/31.01; 106/31.13; 106/31.25; 523/160; 523/161; 524/507; 524/590; 524/591; 524/839; 524/840; 525/123; 525/127; 525/455; 528/44; 528/65; 528/85
(58) Field of Search ................................. 524/507, 589, 524/590, 591, 839, 840; 523/160, 161; 106/31.01, 31.13, 31.25; 525/123, 127, 455; 528/44, 65, 85

(56) References Cited

U.S. PATENT DOCUMENTS 3,808,190 A    4/1974   Dahlmans et al.
4,795,796 A    1/1989   Haubennestel et al.
4,839,414 A    6/1989   Bederke et al.
5,756,637 A    5/1998   Brodt et al.
5,780,542 A    7/1998   Huckestein et al.
5,969,002 A   10/1999   Kijlstra et al.

FOREIGN PATENT DOCUMENTS

| CA | 2086047 | 6/1994 |
|---|---|---|
| DE | 21 25 065 | 5/1971 |
| DE | 36 41 581 | 12/1986 |
| EP | 0 610 534 | 8/1994 |
| EP | 0 742 238 | 11/1996 |
| EP | 0 827 973 | 3/1998 |
| WO | WO 95/30045 | 11/1995 |
| WO | WO 97/12923 | 4/1997 |

Primary Examiner—Patrick D. Niland
(74) Attorney, Agent, or Firm—Oblon, Spivak, McClelland, Maier & Neustadt, P.C.

(57) ABSTRACT

Disclosed is a dispersant obtainable by reacting (i) a di- or polyfunctional isocyanate with (ii) an HX-terminated polymeric compound, where X is COO, O, S or $NR^1$ and $R^1$ is H or $C_1$–$C_6$-alkyl; and either (iii) an HY-terminated homopolymer of a monomer selected from the group consisting of N-vinylamides, N-vinyllactams and vinyl- or allyl-substituted nitrogenous heterocycles or copolymer of one or more of the monomers mentioned and optionally further monomers, where Y is COO, O, S or $NR^2$ and $R^2$ is H or $C_1$–$C_6$-alkyl; or (iv) an HY-functional organic phosphonic ester, where Y is as defined above.

The dispersant is especially useful for dispersing pigments and for preparing inkjet inks.

20 Claims, No Drawings

DISPERSANT

This Application is a 371 of PCT/EP99/06915 Sep. 17, 1999.

The present invention relates to a dispersant and to its use for dispersing pigments and for preparing an inkjet printing ink.

A dispersant is a substance which facilitates the dispersing of particles in a medium by lowering the interfacial tension between the two components. Dispersants are generally surface-active materials having an anionic, cationic or nonionic structure. The presence of a dispersant substantially reduces the dispersing energy required. Dispersed solids may have a tendency to reagglomerate after the dispersing operation, owing to mutual attraction forces. The use of dispersants also counteracts the reagglomeration tendency of the solids.

The dispersant used has to meet particularly high requirements when used for dispersing pigments, such as color or magnetic pigments. Inadequate dispersing manifests itself as increased viscosity in liquid systems, loss of brilliance and hue shifts. Particularly good dispersion of the color pigment is required in the case of inks for use in inkjet printers so as to ensure unimpeded passage of the color pigment particles through the nozzles of the print head which are frequently only a few micrometers in diameter. In addition, pigment particle agglomeration and the associated blockage of the printer nozzles has to be avoided in the standby periods of the printer.

Polymeric dispersants contain in one part of the molecule so-called anchor groups (an anchor group block) which sorb onto the solid to be dispersed. In a spatially separate part of the molecule, polymeric dispersants have a polymer chain which sticks out and whereby solid particles are made compatible with the dispersion medium, or stabilized (stabilizer block). Polymeric dispersants based on polyfunctional isocyanates, a polymeric compound and compounds bearing dispersing groups are described for example in DE-A-21 25 065, WO 97/12923, DE-A-36 41 581, WO 95/30045 and EP-A-0 742 238. In general, the anchor groups have to be specifically adapted to the solid to be dispersed, for example different color pigments, since otherwise the anchor groups may desorb and the dispersion may become unstable in the course of the formulation of the end product or in the course of storage. The need for individual adaptation of the dispersant to the pigment is disadvantageous. It has also been determined that the inkjet inks used hitherto are in need of improvement with regard to their optical density when used for printing cellulosic substrates.

It is an object of the present invention to provide a dispersant which provides stable dispersions with a large number of pigments of differing constitutions and leads to inkjet inks having improved optical density when used for printing cellulosic substrates.

We have found that this object is achieved by a polymeric dispersant obtainable by reacting (i) a di- or polyfunctional isocyanate with
(ii) an HX-terminated polymeric compound, where X is COO, O, S or $NR^1$ and $R^1$ is H or $C_1$–$C_6$-alkyl; and either
(iii) an HY-terminated homopolymer of a monomer selected from the group consisting of N-vinylamides, N-vinyllactams and vinyl- or allyl-substituted nitrogenous heterocycles or copolymer of one or more of the monomers mentioned and optionally further monomers, where Y is COO, O, S or $NR^2$ and $R^2$ is H or $C_1$–$C_6$-alkyl; or (iv) an HY-functional organic phosphonic ester, where Y is as defined above.

The polymeric dispersant of the invention is accordingly obtainable through reaction of three mandatory components, namely a di- or polyisocyanate to act as point of attachment; a polymer compound (hereinafter referred to as stabilizer block) terminated at one end by an isocyanate-reactive group; and an anchor group block, which can be either a homo- or copolymer of a selected nitrogenous monomer or an organic phosphonic ester, which each possess an isocyanate-reactive group. The terms stabilizer block and anchor group block have been introduced for ease of reference in the description part which follows. In general, it is the anchor group block which becomes sorbed onto the solid to be dispersed. In an individual case, however, the relationships may also be different.

The chemical nature of the stabilizer block is not particularly critical. In general, it is preferable for the polymeric compound to be water-soluble or water-swellable. The polymeric compound therefore preferably possesses hydrophilicizing structural elements, such as ether, ester or amide groups. The polymeric compound is terminated at one end by an isocyanate-reactive group. Preferably, there are no further isocyanate-reactive groups along the chain. Preferred polymeric compounds are compounds of the general formula $$R^3\text{—}M_n\text{—}XH$$

where $R^3$ is hydrogen, linear or branched $C_1$–$C_{28}$-alkyl, linear or branched $C_2$–$C_{28}$-alkenyl, linear or branched $C_2$–$C_{28}$-alkynyl or the residue of a singly or multiply unsaturated polymerization initiator or of a chain regulator, M represents identical or different polymerized units of monomers selected from the group consisting of α,β-ethylenically unsaturated mono- or dicarboxylic acids; unsubstituted or hydroxyl-, $C_1$–$C_6$-alkoxy-, polyalkyleneoxy- or halogen-mono- or -polysubstituted $C_1$–$C_{20}$-(cyclo)alkyl or $C_7$–$C_{20}$-aralkyl esters, amides, nitriles or anhydrides of α,β-ethylenically unsaturated mono- or dicarboxylic acids; vinyl or allyl esters of aliphatic or aromatic carboxylic acids; vinyl or allyl ethers; ethylenically unsaturated sulfonic acids or sulfonic acid derivatives; halogenated or unhalogenated ethylenically unsaturated aliphatic $C_2$–$C_{20}$ hydrocarbons; aromatic ethylenically unsaturated compounds and compounds polymerizable to form polyphosphacenes; or is

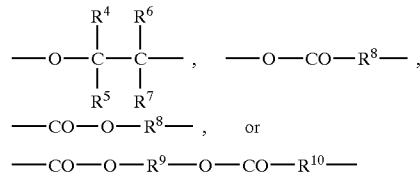

where $R^4$, $R^5$, $R^6$ and $R^7$ are independently H, $C_1$–$C_6$-alkyl, $C_6$–$C_{20}$-aryl, —$CH_2$—Cl or —$CH_2$—OH, and $R^8$, $R^9$ and $R^{10}$ are independently a $C_2$–$C_{20}$-alkylene, $C_6$–$C_{10}$-arylene or $C_7$–$C_{20}$-aralkylene group, and n is an integer between 0 and 10,000, preferably $\geq 2$, especially $\geq 3$, particularly preferably within the range from 30 to 1000, and X is as defined above.

The polymeric compound may be prepared by anionic, cationic or preferably free-radical polymerization of ethylenically unsaturated monomers. Suitable monomers are α,β-ethylenically unsaturated mono- or dicarboxylic acids, such as acrylic acid, methacrylic acid, cinnamic acid, maleic acid, fumaric acid or itaconic acid; optionally hydroxyl-, $C_1$–$C_6$-alkoxy-, polyalkyleneoxy- or halogen-substituted $C_1$–$C_{20}$-(cyclo)alkyl esters, amides, nitriles or anhydrides of α,β-ethylenically unsaturated mono- or dicarboxylic acids, such as methyl(meth)acrylate, ethyl(meth)acrylate, propyl(meth)acrylate, butyl(meth)acrylate, hexyl(meth)acrylate, 2-ethylhexyl(meth)acrylate, stearyl(meth)acrylate, lauryl(meth)acrylate, cyclohexyl(meth)acrylate, benzyl(meth)acrylate, trifluoromethyl(meth)acrylate, hexafluoropropyl(meth)acrylate, tetrafluoropropyl(meth)acrylate, polypropylene glycol mono(meth)acrylates, polyethylene glycol mono(meth)acrylates; vinyl or allyl esters of aliphatic or aromatic carboxylic acids, e.g., vinyl acetate, vinyl propionate, vinyl butanate, vinyl hexanoate, vinyl octanoate, vinyl decanoate, vinyl stearate, vinyl palmitate, vinyl crotonate, divinyl adipate, divinyl sebacate, 2-vinyl 2-ethylhexanoate, vinyl trifluoroacetate; allyl acetate, allyl propionate, allyl butanate, allyl hexanoate, allyl octanoate, allyl decanoate, allyl stearate, allyl palmitate, allyl crotonate, allyl salicylate, allyl lactate, diallyl oxalate, allyl stearate, allyl succinate, diallyl glutarate, diallyl adipate, diallyl pimelate, diallyl cinnamate, diallyl maleate, diallyl phthalate, diallyl isophthalate, triallyl benzene-1,3,5-tricarboxylate, allyl fluoroacetate, allyl perfluorobutyrate, allyl perfluorooctanoate; ethylenically unsaturated sulfonic acids and sulfonic acid derivatives, such as vinylsulfonic acid, allylsulfonic acid, methallylsulfonic acid, their esters and halides, vinyl benzenesulfonate, 4-vinylbenzenesulfonamide; vinyl or allyl ethers, such as vinyl methyl ether, vinyl ethyl ether, vinyl propyl ether, vinyl isopropyl ether, vinyl butyl ether, vinyl isobutyl ether, vinyl hexyl ether, vinyl octyl ether, vinyl decyl ether, vinyl dodecyl ether, vinyl-2-ethylhexyl ether, vinyl cyclohexyl ether, vinyl benzyl ether, vinyl trifluoromethyl ether, vinyl hexafluoropropyl ether and vinyl tetrafluoroethyl ether; optionally halogenated ethylenically unsaturated aliphatic $C_2$–$C_{20}$ hydrocarbons, such as ethylene, propylene, butylene, isobutene, hexene, vinylcyclohexane; vinylidene fluoride, vinylidene chloride, vinyl fluoride, vinyl chloride, hexafluoropropene, trifluoropropene, 1,2-dichloroethylene, 1,2-difluoroethylene and tetrafluoroethylene; aromatic ethylenically unsaturated compounds, such as styrene and α-methylstyrene; and compounds which are polymerizable to form polyphosphacenes, such as phosphorus nitride chlorides, e.g., phosphorus dichloride nitride, hexachloro (triphosphacene) and their partially or completely alkoxy-, phenoxy-, amino- and fluoroalkoxy-substituted derivatives. Preference is given to $C_1$–$C_{20}$-alkyl(meth)acrylates, such as methyl(meth)acrylate, ethyl(meth)acrylate, propyl(meth)acrylate, butyl(meth)acrylate, hexyl(meth)acrylate, 2-ethylhexyl(meth)acrylate; $C_2$–$C_{20}$-hydroxyalkyl(meth)acrylates, such as 2-hydroxyethyl(meth)acrylate; styrene; (meth)acrylonitrile; (meth)acrylamide; vinyl $C_2$–$C_{20}$-alkanoates, such as vinyl acetate; $C_1$–$C_{20}$-alkyl vinyl ethers, such as methyl vinyl ether, ethyl vinyl ether; olefinic hydrocarbons, such as ethene, propene, butene, butadiene; vinyl chloride; vinyl fluoride, vinylidene difluoride; hexafluoropropene. The use of $C_1$–$C_8$-alkyl(meth)acrylates is particularly preferred.

The polymeric compound must be terminated by an isocyanate-reactive group XH at at least one chain end. This is accomplished with initiators which decompose to form, for example, a hydroxyl radical and/or with chain regulators which contain a hydroxyl or mercapto function, for example. Initiators of this type are for example tert-butyl hydroperoxide, tetrahydrofuran hydroperoxide, cumene hydroperoxide or 2,2'-azobis(2-methyl-N-(2-hydroxyethyl) propionamide). If the hydroxyl group is introduced via a regulator only, it is also possible to use other initiators which decompose into free radicals under the reaction conditions, such as peroxides, hydroperoxides, persulfates, perazo compounds and redox catalysts, which comprise an oxidizing component and a reducing component, e.g., ascorbic acid, glucose, bisulfites. Specific examples of suitable initiators are for example azobis(isobutyronitrile), di(tert-butyl) peroxide, didodecanoyl peroxide, dibenzoyl peroxide, tert-butyl peracetate or tert-butyl 2-methylperpropionate.

Suitable regulators are aminoalcohols, aminophenols and also especially thioalkanols, such as 3-hydroxypropanethiol, 2-hydroxyethyl 3-mercaptopropionate and especially 2-hydroxyethanethiol(mercaptoethanol). It is also possible to use mixtures of different initiators and/or chain regulators. Initiators and/or chain regulators are generally used in an amount within the range from 0.1 to 20% by weight, preferably within the range from 0.1 to 5% by weight, based on the mixture of monomers used. Any of these polymeric compounds which are not commercially available can be prepared by customary emulsion, suspension or solution polymerization processes.

The polymeric compound can be a monoalkyl ether of a polyoxyalkylene glycol. Such compounds are obtained for example by reacting an alkanol with alkene oxides, such as ethylene oxide, propylene oxide or butylene oxide, or epichlorohydrin. Preferred compounds of this type are $C_1$–$C_{18}$ alkanols alkoxylated with from 5 to 10,000, preferably from 5 to 80, mol of ethylene oxide and/or propylene oxide.

The polymeric compound can also be a polyester. These can be prepared according to any desired method for preparing polyesters. Examples are the polymerization of lactones, for example propiolactone, caprolactone and pivalolactone; the condensation of hydroxy acids, for example 10-hydroxydecanoic acid and 12-hydroxystearic acid; and the condensation of diols and dicarboxylic acid, for example ethylene glycol/decamethylenedicarboxylic acid, hexamethylene glycol/succinic acid. The formation of polyesters terminated by hydroxyl groups and/or carboxyl groups at both ends should be reduced to a minimum. This can be accomplished by the additional presence of monocarboxylic acids or monools. Examples are oleic acid, stearic acid, linoleic acid or oxo alcohols.

The use of polyoxyalkylene glycol monoalkyl ethers, especially polyoxyethylene glycol monomethyl ether, or of a polymer of one or more $C_1$–$C_4$-alkyl methacrylates, as of a copolymer of methyl methacrylate and butyl methacrylate, is particularly preferred.

The weight average molecular weight of the stabilizer block is preferably within the range from about 250 to 1,000,000, especially within the range from about 500 to 7000.

The point of attachment for the polymeric dispersants of the invention takes the form of customary diisocyanates and/or customary higher polyisocyanates having an average NCO functionality of from 2.0 to 4.5. These components can be present alone or mixed.

Examples of customary diisocyanates are aliphatic diisocyanates, such as tetramethylene diisocyanate, hexamethylene diisocyanate, octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates, such as 1,4-, 1,3- or 1,2-diisocyanatocyclohexane, 4,4'-di(isocyanatocyclohexyl)methane, 1-isocyanato-3,3,5-trimethyl-5-(isocyanatomethyl)cyclohexane(isophorone diisocyanate) or 2,4- or 2,6-diisocyanato-1-methylcyclohexane, and also aromatic diisocyanates and also 2,4- or 2,6-toluylene diisocyanate, tetramethylxylylene diisocyanate, p-xylylene diisocyanate, 2,4'- or 4,4'-diisocyanatodiphenylmethane, 1,3- or 1,4-phenylene diisocyanate, 1-chloro-2,4-phenylene diisocyanate, 1,5-naphthylene diisocyanate, biphenylylene 4,4'-diisocyanate, 4,4'-diisocyanato-3,3'-dimethylbiphenyl, 3-methyldiphenylmethane 4,4'-diisocyanate or oxydiphenyl 4,4'-diisocyanate. Mixtures of the diisocyanates mentioned may also be present. Of these, preference is given to aliphatic diisocyanates, especially hexamethylene diisocyanate and isophorone diisocyanate.

Examples of suitable customary higher polyisocyanates are triisocyanates, such as 2,4,6-triisocyanatotoluene or 2,4,4'-triisocyanatodiphenyl ether, or the mixtures of di-, tri- and higher polyisocyanates which are obtained by phosgenation of appropriate aniline/formaldehyde condensates and represent methylene-bridged polyphenyl polyisocyanates.

Of particular interest are customary aliphatic higher polyisocyanates of the following groups:

(a) Isocyanurate group containing polyisocyanates of aliphatic and/or cycloaliphatic diisocyanates. Particular preference is given here to the corresponding isocyanato-isocyanurates based on hexamethylene diisocyanate and isophorone diisocyanate. These isocyanurates are in particular simple trisisocyanatoalkyl or trisisocyanatocycloalkyl isocyanurates, which are cyclic trimers of the diisocyanates, or mixtures with their higher homologs containing more than one isocyanurate ring. The isocyanato-isocyanurates generally have an NCO content of from 10 to 30% by weight, in particular from 15 to 25% by weight, and an average NCO functionality of from 2.6 to 4.5.

(b) Uretdione diisocyanates having aliphatically and/or cycloaliphatically attached isocyanate groups, which are preferably derived from hexamethylene diisocyanate or isophorone diisocyanate. Uretdione diisocyanates are cyclic dimerization products of diisocyanates.

(c) Biuret group containing polyisocyanates having aliphatically attached isocyanate groups, especially tris(6-isocyanatohexyl)biuret or its mixtures with its higher homologs. These biuret group containing polyisocyanates generally have an NCO content of from 18 to 25% by weight and an average NCO functionality of from 3 to 4.5.

(d) Urethane and/or allophanate group containing polyisocyanates having aliphatically or cycloaliphatically attached isocyanate groups, as are obtainable for example by reaction of excess amounts of hexamethylene diisocyanate or of isophorone diisocyanate with simple polyhydric alcohols, such as trimethylolpropane, glycerol, 1,2-dihydroxypropane or mixtures thereof. These urethane and/or allophanate group containing polyisocyanates generally have an NCO content of from 12 to 20% by weight and an average NCO functionality of from 2.5 to 3.

(e) Oxadiazinetrione group containing polyisocyanates, preferably derived from hexamethylene diisocyanate or isophorone diisocyanate. Such oxadiazinetrione group containing polyisocyanates are preparable from diisocyanate and carbon dioxide.

(f) Uretoneimine-modified polyisocyanates.

Aliphatic diisocyanates and aliphatic higher polyisocyanates are particularly preferred for preparing the polymeric dispersant of the invention. Polyisocyanates having an average NCO functionality of from 1.7 to 5, especially about 3, are particularly preferred.

In one embodiment of the invention, the anchor group block is a homopolymer of a monomer selected from the group consisting of N-vinylamides, N-vinyllactams and vinyl- or allyl-substituted nitrogenous heterocycles or a copolymer of one or more of the monomers mentioned and optionally further monomers. Examples of useful further monomers are acrylic acid, acrylic and methacrylic esters, acrylamide, methacrylamide and vinyl esters. The further monomers preferably constitute less than 50 mol %, especially less than 15 mol %, of total monomer units. Preferably, the anchor group block comprises or consists exclusively of polymerized units of N-vinylpyrrolidone, N-vinylcaprolactam, N-vinylimidazole and/or N-vinylformamide. It is further preferable for the fraction of N-vinylpyrrolidone units to be 50 mol % or higher, based on the total monomer units. The use of polyvinylpyrrolidone is particularly preferred. Examples of further suitable monomers are 2- and 4-vinylpyridine. The polymers of vinylpyrrolidone and of the other vinyl compounds can be prepared by free-radical polymerization according to solution or suspension polymerization processes using free-radical initiators. The homo- or copolymer preferably has a K value of from 10 to 100, especially from 10 to 30. According to the invention, the homo- or copolymer must be terminated by an isocyanate reactive group. This is accomplished by conducting the polymerization in water or a lower alcohol, for example isopropanol. However, the polymerization can also be conducted in inert organic solvents, in which case a chain regulator, for example a thioalkanol, especially mercaptoethanol, is used. It is also possible to use initiators which decompose to provide a hydroxyl radical.

In another embodiment of the invention, the anchor group block is an organic phosphonic ester which contains at least one isocyanate reactive group. The phosphonic ester can contain one or more phosphonate groups. Such compounds can be prepared for example by the Michaelis-Arbusow reaction, in which case the isocyanate reactive group is introduced through suitable choice of the starting compounds. The phosphonic ester preferably has the following general structural formula:

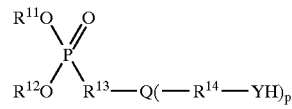

where $R^{11}$ and $R^{12}$ are independently $C_1$–$C_4$-alkyl, especially $R^{11}=R^{12}=$methyl or ethyl;

Q is $NR_{(2-p)}$ or $CR_{(3-p)}$ (R=H or $C_1$–$C_8$-alkyl);

$R^{13}$ and $R^{14}$ are independently a chemical bond or unsubstituted or $C_1$–$C_8$-alkyl- or aryl-substituted $C_1$–$C_{10}$-alkylene with or without interruption by O, NR, CO, COO, OCO, CONR or NRCO;

p is 1 or 2; and

Y is as defined above.

A preferred example of a phosphonic ester to be used according to the invention is diethyl N,N-bis(hydroxyethyl)aminomethylphosphonate. Other examples are the dimethyl or diethyl esters of 3-hydroxymethylamino-3- oxopropylphosphonic acid, 3-aminopropylphosphonic acid, 1-aminopropylphosphonic acid, 2-aminooctylphosphonic acid, 1-aminooctylphosphonic acid, 1-aminobutylphosphonic acid, hydroxymethylphosphonic acid and 1-hydroxyethylphosphonic acid.

The reaction of the di- or polyisocyanate with the stabilizer block and the anchor group block can take place in two steps or in a one-pot reaction. Preferably, however, the reaction takes place in two steps where the di- or polyisocyanate is reacted with the stabilizer block in the first step. The reaction can take place in the absence or presence of a solvent, preference being given to the reaction in the presence of a solvent, such as acetone, THF, toluene, dioxane. When the stabilizer block has been prepared by polymerization of an ethylenically unsaturated compound, the reaction of the stabilizer block with the di- or polyisocyanate can advantageously be carried out in the same solvent as the free-radical polymerization. The reaction can be carried out without catalyst or preferably in the presence of a catalyst, such as a tertiary amine, especially triethylamine, or a metal salt, especially tin octoate or lead octoate, or an organometallic compound, such as dibutyltin dilaurate or titanium tetramethoxide. The reaction can generally be carried out at a temperature from room temperature to 125° C., especially within the range from 40 to 90° C.

The reaction product can be isolated from the reaction mixture according to known methods, for example by extraction or precipitation. Preferably, however, the reaction product is reacted with the anchor group block without isolation. The reaction with the anchor group block can be carried out in the absence of a solvent or advantageously in the presence of an organic solvent, especially in the solvent in which the reaction of the di- or polyisocyanate with the stabilizer block took place. The reaction can be catalyzed, in which case the above-indicated catalysts can be used.

The stabilizer block is preferably used in an amount which is sufficient for reaction with from 5 to 80% of the isocyanate groups of the polyisocyanate, and the anchor group block is preferably used in an amount which is sufficient for reaction with from 5 to 80% of the isocyanate groups in the polyisocyanate. In particular, a di- or polyisocyanate of functionality n is reacted with such amounts of stabilizer and anchor group block that about 1 mol of stabilizer block and (n−1) mol of anchor group block are used per 1 mol of di- or polyisocyanate. In a preferred embodiment, an isocyanate which is trifunctional on average is reacted with about 1 mol of stabilizer block and about 2 mol of anchor group block. It is preferable to determine the number of free isocyanate groups, for example by the method of DIN EN 1242, after the reaction with the stabilizer block and to add the anchor group block in an amount which is sufficient to saturate the free isocyanate groups. Alternatively, the anchor group block can be added in an amount which is not sufficient to saturate the free isocyanate groups. In this case, the remaining isocyanate groups can be reacted with water or other reagents to form urea, carbamate or thiocarbamate compounds.

The polymeric dispersants of the invention are useful, individually or mixed, especially for wetting, dispersing and stabilizing pigments in aqueous or solvent-containing suspensions. It has been determined that the dispersants of the invention provide good fixation of the pigments especially on cellulosic fibers, which is illustrated by excellent wet and dry ruboff resistances. The pigments can be selected from among color pigments or magnetic pigments. Examples of suitable pigments are organic pigments in the form of monoazo pigments, such as C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 251, 112, 146, 170, 184, 210 and 245; C.I. Pigment Yellow 1, 3, 73, 74, 65, 97, 151 and 183; disazo pigments, such as C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188; anthanthrone pigments, such as C.I. Pigment Red 168 (C.I. Vat Orange 3); anthraquinone pigments, such as C.I. Pigment Yellow 147 and 177, C.I. Pigment Violet 31; anthrapyrimidine pigments, such as C.I. Pigment Yellow 108 (C.I. Vat Yellow 20); quinacridone pigments, such as C.I. Pigment Red 122, 202 and 206; C.I. Pigment Violet 19; quinophthalone pigments, such as C.I. Pigment Yellow 138; dioxazine pigments, such as C.I. Pigment Violet 23 and 37; flavanthrone pigments, such as C.I. Pigment Yellow 24 (C.I. Vat Yellow 1); indanthrone pigments, such as C.I. Pigment Blue 60 (C.I. Blue 4) and 64 (C.I. Vat Blue 6); isoindoline pigments, such as C.I. Pigment Orange 69; C.I. Pigment Red 260; C.I. Pigment Yellow 139 and 185; isoindolinone pigments, such as C.I. Pigment Orange 61; C.I. Pigment Red 257 and 260; C.I. Pigment Yellow 109, 110, 173 and 185; isoviolanthrone pigments, such as C.I. Pigment Violet 31 (C.I. Vat Violet 1); metal complex pigments, such as C.I. Pigment Yellow 117, 150 and 153; C.I. Pigment Green 8; perinone pigments, such as C.I. Pigment Orange 43 (C.I. Vat Orange 7); C.I. Pigment Red 194 (C.I. Vat Red 15); perylene pigments, such as C.I. Pigment Black 31 and 32; C.I. Pigment Red 123, 149, 178, 179 (C.I. Vat Red 23), 190 (C.I. Vat Red 29) and 224; C.I. Pigment Violet 29; phthalocyanine pigments, such as C.I. Pigment Blue 15, 15:1, 15:2, 15:3, 15:4, 15:6 and 16; C.I. Pigment Green 7 and 36; pyranthrone pigments, such as C.I. Pigment Orange 51; C.I. Pigment Red 216 (C.I. Vat Orange 4); thioindigo pigments, such as C.I. Pigment Red 88 and 181 (C.I. Vat Red 1); C.I. Pigment Violet 38 (C.I. Vat Violet 3); triarylcarbonium pigments, such as C.I. Pigment Blue 1, 61 and 62; C.I. Pigment Green 1; C.I. Pigment Red 81, 81:1 and 169; C.I. Pigment Violet 1, 2, 3 and 27; and C.I. Pigment Black 1 (aniline black); C.I. Pigment Yellow 101 (aldazine yellow); C.I. Pigment Brown 22;

vat dyes (in addition to those already mentioned above), such as C.I. Vat Yellow 2, 3, 4, 5, 9, 10, 12, 22, 26, 33, 37, 46, 48, 49 and 50; C.I. Vat Orange 1, 2, 5, 9, 11, 13, 15, 19, 26, 29, 30 and 31; C.I. Vat Red 2, 10, 12, 13, 14, 16, 19, 21, 31, 32, 37, 41, 51, 52 and 61; C.I. Vat Violet 2, 9, 13, 14, 15, 17 and 21; C.I. Vat Blue 1 (C. I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74; C.I. Vat Green 1, 2, 3, 5, 7, 8, 9, 13, 14, 17, 26, 29, 30, 31, 32, 33, 40, 42, 43, 44 and 49; C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84; C.I. Vat Black 1, 2, 7, 8, 9, 13, 14, 16, 19, 20, 22, 25, 27, 28, 29, 30, 31, 32, 34, 36, 56, 57, 58, 63, 64 and 65;

inorganic pigments, in the form of white pigments, such as titanium dioxide (C.I. Pigment White 6), zinc white, pigment grade zinc oxide; zinc sulfide, lithopone; lead white; black pigments, such as iron oxide black (C.I. Pigment Black 11), iron manganese black, spinel black (C.I. Pigment Black 27); carbon black (C.I. Pigment Black 7); color pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt violet, manganese violet; iron oxide red (C.I. Pigment Red 101); cadmium sulfoselenide (C.I. Pigment Red 108); molybdate red (C.I. Pigment Red 104); ultramarine red; iron oxide brown, mixed brown, spinel and corundum phases (C.I. Pigment Brown 24, 29 and 31), chrome orange; iron oxide yellow (C.I. Pigment Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34), zinc yellow, alkaline earth metal chromates; Naples yellow; bismuth vanadate (C.I. Pigment Yellow 184); interference pigments, such as metallic effect pigments based on coated metal platelets; pearl luster pigments based on mica platelets coated with metal oxide; liquid crystal pigments.

Useful magnetic pigments are the customary oxidic pigments, such as $\gamma$-$Fe_2O_3$, $\gamma$-$Fe_3O_4$ and $CrO_2$, or metallic pigments, such as Fe, Co or Ni. These pigments are important in the manufacture of magnetic recording materials. For the stated purpose, the pigment preparations comprising a magnetic pigment and the dispersant of the invention with or without fillers are dispersed in a mixture of a solvent or diluent, a binder and further additives, such as a lubricant, and applied to a nonmagnetic base layer.

Advantageously, the pigments are initially converted with the dispersant of the invention into a suitable use-form, a pigment preparation. Pigment preparations can be used directly, for example as print paste or ink, or for preparing a use-form, for example a writing or inkjet ink. The pigment preparations are incorporable into aqueous or organic systems in a simple manner and without undesirable flocculation. To produce the pigment preparations, the pigments are mixed with the dispersants of the invention and a diluent, preferably water, with or without further additives. For the liquid process, where the fine subdivision of the pigment takes place in the presence of relatively large amounts of diluent, it is possible to use in particular dissolvers for predispersing and stirred ball mills, such as bead mills in general and those having small grinding beads (0.3 mm in diameter, for example), such as the double cylinder bead mills (DCP-Super Flow®) from Draiswerke GmbH, Mannheim, or the centrifugal fluidized bed mills (ZWM) from Netsch Geratebau GmbH, Selb. This provides finely divided and low viscosity pigment preparations. Compared with customary dispersants, the dispersant of the invention provides advantageously high flowabilities and stability in storage. When pigment preparations produced using the dispersant of the invention are stored, no sedimentation of pigment is observed for months. The dispersant of the invention, moreover, has universal utility for a multiplicity of different pigments.

Alternatively, the pigment and the dispersant can be processed, with or without heating, to form a plastically deformable material. Suitable for this purpose are in particular mixing and plasticating machines, such as kneaders, extruders and/or roll mills.

The pigment present in the pigment preparation following dispersing should be in a state of very fine subdivision. It is preferable for 95%, more preferably 99%, of the pigment particles to have a particle size <1 $\mu$m, preferably <0.5 $\mu$m.

The pigment preparations of the invention generally comprise from 0.1 to 35% by weight, preferably from 0.1 to 20% by weight, particularly preferably from 0.2 to 10% by weight, of pigment.

Water is the main constituent of the pigment preparations of the invention. The water content is generally within the range from 35 to 90% by weight, preferably within the range from 45 to 80% by weight.

The pigment preparations of the invention preferably further comprise a humectant. Useful humectants include not only polyhydric alcohols containing in particular from 3 to 8 carbon atoms, such as glycerol, erythritol, pentaerythritol, pentitols, such as arabitol, adonitol and xylitol, and hexitols, such as sorbitol, mannitol and dulcitol, but also preferably polyalkylene glycols and polyalkylene glycol monoalkyl ethers, which terms shall also cover the lower (di-, tri- and tetra-)alkylene glycols and alkylene glycol ethers. These compounds preferably have average molecular weights of from 100 to 1500, and polyethylene glycols and polyethylene glycol ethers having an average molecular weight of <800 are particularly preferred.

Examples of these humectants are di-, tri- and tetraethylene glycol, diethylene glycol monomethyl, monoethyl, monopropyl and monobutyl ethers and trimethylene glycol monomethyl, monoethyl, monopropyl and monobutyl ethers. Also suitable are pyrrolidone and N-alkylpyrrolidones, such as N-methylpyrrolidones, which additionally augment the penetration of the ink into the substrate material (paper, for example). Examples of particularly preferred humectants are mono-, di- and triethylene glycol monobutyl ethers and N-methylpyrrolidone. The fraction of humectant in the pigment preparations of the invention is generally within the range from 0.1 to 35% by weight, especially within the range from 5 to 25% by weight. The use of combinations of the humectants mentioned is often advantageous. An example of a combination which is particularly suitable is a combination of N-methylpyrrolidone and triethylene glycol monobutyl ether.

The pigment preparations of the present invention may self-evidently comprise further assistants of the type which are customary especially for (aqueous) inkjet inks and in the printing and coatings industry. Examples of such assistants include preservatives (such as 1,2-benzisothiazolin-3-one and its alkali metal salts, glutar- dialdehyde and/or tetramethylolacetylene urea), antioxidants, degassers/defoamers (such as acetylenediols and ethoxylated acetylenediols, which customarily contain from 20 to 40 mol of ethylene oxide per mole of acetylenediol and also have a dispersing effect or phosphoric acid/alcohol mixtures), viscosity regulators, flow agents, wetters, anti-settlers, luster improvers, lubricants, adhesion improvers, antiskinning agents, delusterants, emulsifiers, stabilizers, water-repellents, light control additives, hand improvers and antistats. If such assistants are part of the pigment preparations of the invention, their total amount is typically $\leq$1% by weight, based on the weight of the preparation.

The pigment preparations of the invention have a dynamic viscosity which is typically within the range from 1 to 20 $mm^2$/sec, preferably within the range from 1 to 5 $mm^2$/sec.

The surface tension of the pigment preparations of the invention is generally within the range from 20 to 70 mN/m, preferably within the range from 35 to 60 mN/m.

The pH of the pigment preparations of the invention is generally 5 to 11, preferably 7 to 9.

The pigment preparations of the invention are advantageously prepared as follows:

The pigment, for example in the form of an aqueous presscake or in the form of a dry pigment powder, is mixed together with one or more dispersants of the invention in the presence of water and dispersed in a suitable apparatus. The resulting mixture is then ground in a mill to the desired pigmentary particle size, and further assistants are then added. Finally, the preparation is end-adjusted by addition of appropriate amounts of water and optionally one or more humectants and also optionally further assistants and, after mixing, fixed using a filtering means with fines removal within the range from generally 10 to 1 μm and preferably subsequently using a further filtering means with fines removal within the range from 1 to 0.5 μm.

The pigment preparations of the invention can be used with advantage in the process of the invention for printing sheetlike or three-dimensionally configured substrates by the inkjet process, which comprises printing the pigment preparations onto the substrate and subsequently fixing the print obtained.

In the inkjet process, the typically aqueous inks are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23–29, and 21 (1989), No. 6, 27–32.

The pigment preparations of the invention are particularly useful as inks for the bubble jet process or the process employing a piezoelectric crystal.

The pigment preparations of the invention may be printed on all types of substrate materials. Examples of substrate materials include coated or uncoated cellulosics such as paper, paperboard, cardboard, wood and woodbase, coated or uncoated metallic materials such as foils, sheets or workpieces composed of aluminum, iron, copper, silver, gold, zinc or alloys thereof, coated or uncoated silicatic materials such as glass, porcelain and ceramics, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers such as gelatin, textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric, leather—both natural and artificial—in the form of smooth leather, nappa leather or suede leather, comestibles and cosmetics.

The substrate material may be sheetlike or three-dimensional in configuration and may be printed with the pigment preparations of the invention both uniformly and imagewise.

The pigment preparations of the invention are useful inkjet inks having altogether advantageous application properties, especially good flow characteristics, producing prints of high rubfastness, wetrubfastness, lightfastness and waterfastness.

The pigment preparations are also very useful for producing writing inks and toners, especially aqueous liquid toners and pulverulent toners. Toners may be prepared for example conventionally by mixing, kneading, grinding and sifting pigments using the polymeric dispersants.

The Examples which follow illustrate the invention.

EXAMPLES

Example 1

Monomethyl polyethylene glycol (MW 2000, 1 mol) is dissolved in acetone (35% strength solution). The solution is heated to 50° C., and a trifunctional isocyanate (trimeric hexamethylene diisocyanate; Basonat® HB 100, BASF) (1 mol) and also dibutyltin dilaurate as catalyst are added. In line with the remaining isocyanate content, OH-monofunctionalized polyvinylpyrrolidone (PVP) (K value about 17) is then added. The reaction is continued until isocyanate groups are no longer detectable.

Example 2

Methyl methacrylate (2.2 mol) and butyl methacrylate (1.5 mol) are polymerized with azoisobutyronitrile (AIBN) in THF. Thioethanol (0.12 mol) is added as regulator. To this solution are added a trifunctional isocyanate (trimeric hexamethylene diisocyanate; Basonat® HB 100, BASF) (0.12 mol), dissolved in THF, and also dibutyltin dilaurate. The solution is adjusted to a solids content of 50% with THF. In line with the remaining isocyanate content, an OH-terminated polyvinylpyrrolidone (K value about 17, 50% strength in methyl isobutyl ketone) is added. The reaction is continued until isocyanate groups are no longer detectable.

Example 3

25 g of oleic acid are heated to 155° C. together with 2 drops of dibutyltin dilaurate, and 174 g of ε-caprolactone and also 4 drops of dibutyltin dilaurate are added dropwise. The batch is maintained at 160° C. for 22 h. 22 g of this polymer are dissolved in tetrahydrofuran together with 5.7 g of Basonat HB 100 and heated to 65° C. After 2.5 h, 60 g of polyvinylpyrrolidone (K value about 17), dissolved in tetrahydrofuran, are added and the mixture is maintained at about 70° C. for a further 16 h.

Example 4

Monomethyl polyethylene glycol (MW 2000; 1 mol) is dissolved in tetrahydrofuran (45% strength solution). The solution is heated to 50° C., and a trifunctional isocyanate (trimeric hexamethylene diisocyanate; Basonat® HB 100, BASF) (1 mol) and also dibutyltin dilaurate as catalyst are added. In line with the remaining isocyanate content, diethyl N,N-bis(hydroxyethyl)aminomethylphosphonate (Fyrol® 6, Akzo; about 2 mol; 50% strength in THF) is added. The reaction is continued until isocyanate groups are no longer detectable.

Example 5

54 g of $C_{13}/C_{15}$ oxo alcohol are initially charged together with 5 drops of dibutyltin dilaurate, and 500 g of ε-caprolactone are added dropwise at 160° C. together with 10 drops of dibutyltin dilaurate. The batch is maintained at 160° C. for 9 h. 22 g of this polymer are dissolved in tetrahydrofuran together with 5.7 g of Basonat HB 100 and heated to 65° C. After 2.5 h, 60 g of polyvinylpyrrolidone (K value about 17), dissolved in tetrahydrofuran, are added and the mixture is maintained at about 70° C. for a further 16 h.

Example 6

Various pigment preparations were produced by the liquid process. To this end, 22.5 g (reckoned as dry weight) of isoindoline yellow (P.Y. 185) or calcium-layered BONS pigment (P.R. 57:1), 30 g of copper phthalocyanine blue (P.B. 15:3) in the form of presscake, 22.5 g of quinophthalone yellow (P.Y. 138), 22.5 g of naphthol AS red (P.R. 146), 22.5 g of quinacridone red (P.R. 122) or 30 g of pigment carbon blacks (P.B. 7) in the form of pigment powder were mixed with 11.25 g (or 15 g in the case of P.B. 7) of dispersing resin as per Example 4 or 1 and 3 g of polyethylene glycol (average molecular weight 400) and also 1.5 g of fungicide (Proxel® XL2 from Zeneca) in batches of 150 g in the presence of completely ion-free water and dispersed in a stirred ball mill containing in each case 1000 g of zirconium oxide beads (yttrium-stabilized; from 0.3 to 0.4 mm in diameter). The carbon black pigments were ground using 1.2 g of propylene glycol instead of polyethylene glycol. The wet grinding operations for the individual pigments took place in each case at a circumferential speed of 10 m/s in a vertical stirred ball mill equipped with a double grinding disk. To avoid foaming, antifoam (based on a commercially available phosphoric ester mixture) was added in amounts of up to 0.15 g during the dispersing. The pigment concentrations and the particle sizes of the pigment preparations measured using the Ultra Particle Analyser (UPA) from Leeds & Northrup are reported below in Table 1.

Example 7

Kneading trials were carried out by first mixing the pigment in the form of presscake or in the form of powder with the resin in a kneader to form a kneadable material (which took up to 2 hours for aqueous presscakes). The readily kneadable material was then kneaded at about 140° C. for 2 hours.

44% by weight pigment preparations were produced in each case in this way by hot kneading in an IKA® kneader (from Jahnke & Kunkel). Following cooling and mechanical comminution of the solid resin preparations, these were convertible, by dilution and solution with completely ion-free water, into neutral aqueous pigment dispersions. However, by dry grinding with a jet mill it was also possible to produce powder preparations for use as toners.

A presscake based on β-copper phthalocyanine blue (45.6% by weight, reckoned dry P.B. 15:3) was converted by hot kneading with dispersing resin of Example 1 into a resin preparation having a pigment content of 45.2% by weight. 120 g of resin were introduced into an IKA® kneader and melted at 120° C., at which point 219.3 g of pigment presscake were added and the temperature was raised to up to 150° C. After about 1 hour the water had evaporated to leave a tough kneadable material. This material was kneaded at 120° C. for 2 hours, with samples being taken in between. After cooling, the products were comminuted and converted in completely ion-free water into neutral liquid preparations. Particle size measurements showed a pigment state of very fine subdivision after just 60 minutes' kneading.

A pigment powder based on quinophthalone yellow (P.Y. 138) was converted with the dispersing resin of Example 1 in an IKA kneader into a solid resin preparation having a pigment content of 44% by weight. 120 g of resin were introduced into the kneader and melted at 120° C., at which point 95.5 g of pigment were introduced and converted into a soft kneadable material within 5 minutes. To obtain more powerful kneading, the thermostat of the kneader was adjusted from 120° C. to 50° C. over 15 minutes. The material became very viscous and was kneaded for 2 hours, samples being taken every 30 minutes. The cooled material was mechanically comminuted and converted with completely ion-free water into a neutral liquid preparation. Particle size measurements showed a constant increase in particle fineness with increasing kneading time with the desired high fineness being obtained at the end of the run.

Example 8

The pigment preparations obtained in Example 6 were converted into inks by addition of water and tributylglycol. The finished inks contained 3% of color pigments and 10% of tributylglycol. In addition, isoindoline yellow (P.Y. 185 from Table 1) was used as an example to prepare aqueous inks (pigmentation: 3% by weight) using further solvents (each 10% by weight), such as dipropylene glycol, 2-ethyl-2-(hydroxymethyl)-1,3-propanediol or pyrrolidone (Table 2). The inks were used to print plain paper of the type Intercopy Laser Copier and coated paper of the type Epson 720 dpi Ink Jet Paper on an inkjet printer (HP Deskjet 600). The optical density of the prints obtained was determined at the absorption maximum using a Spektraflash SF 600 Plus-CT (with Ulbricht sphere) from Datacolor. The results are reported below in Tables 1 and 2. The waterfastness of the prints was determined by making two parallel cuts and perpendicularly thereto likewise two parallel cuts in a uniformly printed surface. This produced a square cutout from the middle of the surface, and this cutout was stirred in 500 ml of distilled water at 200 rpm for 5 minutes. After drying, the cutout square was put back into the hole. The optical density of the washedout square and of the untreated environment was measured. In all tests, the optical density of the washedout square was equal to the optical density of the untreated environment within the margin of measuring error. The wet ruboff test was carried out with a moist paper cloth under light pressure. No ink gave a visible ruboff.

TABLE 1

Aqueous pigment preparations through dispersing in a stirred ball mill, particle size of dilute suspensions and optical densities of inkjet inks (pigmentation: 3% by weight)

| Pigment preparation after dispersing | Colour Index name | Pigment concentration [% by weight] | Dispersant example | Particle size Peak [nm] | Particle size Median [nm] | Optical density of ink on Intercopy Laser Copier | Optical density of ink on Epson 20 dpi Ink Jet Paper |
|---|---|---|---|---|---|---|---|
| 1 | Pigment Yellow 185 | 15 | 4 | 158 | 130 | 0.88 | 1.29 |
| 2 | Pigment Yellow 185 | 15 | 1 | 36 | 70 | 0.80 | 1.21 |
| 3 | Pigment Red 57:1 | 15 | 1 | 158 | 106 | 0.82 | 1.30 |
| 4 | Pigment Blue 15:3 | 20 | 4 | n.k. | n.k. | 0.88 | 1.36 |
| 5 | Pigment Blue 15:3 | 15 | 1 | 172 | 140 | 0.79 | 1.32 |
| 6 | Pigment Red 146 | 15 | 4 | 158 | 144 | 0.85 | 1.35 |
| 7 | Pigment Red 146 | 15 | 1 | 172 | 168 | 0.85 | 1.28 |
| 8 | Pigment Red 122 | 15 | 4 | 122 | 89 | 0.84 | 1.28 |
| 9 | Pigment Red 122 | 15 | 1 | 111 | 109 | 0.85 | 1.29 |
| 10 | Pigment Yellow 138 | 15 | 1 | 187 | 190 | 0.82 | 1.27 |
| 11 | Pigment Yellow 138 | 15 | 4 | 204 | 186 | 0.81 | 1.26 |
| 12 | Pigment Black 7 | 20 | 4 | 86 | 81 | 0.79 | 1.41 |
| 13 | Pigment Black 7 | 20 | 1 | 79 | 78 | 0.88 | 1.44 | n.k. = not known

TABLE 2

Inkjet inks from aqueous isoindoline pigment preparations (Pigment Yellow 185), standardized with various solvents and water (pigmentation: 3% by weight)

| Pigment preparation after dispersing | Dispersant Example | Solvent 10% by weight | Optical density of ink on Intercopy Laser Copier | Optical density of ink on Epson 720 dpi Ink Jet Paper |
|---|---|---|---|---|
| 1 | 4 | Butyltriglycol | 0.88 | 1.29 |
| 1 | 4 | Dipropylene glycol | 0.81 | 1.27 |
| 1 | 4 | 2-Ethyl-3-(hydroxymethyl)-1-3-propanediol) | 0.80 | 1.24 |
| 1 | 4 | Pyrrolidinone | 0.93 | 1.27 |
| 2 | 1 | Butyltriglycol | 0.80 | 1.21 |
| 2 | 1 | Dipropylene glycol | 0.83 | 1.28 |
| 2 | 1 | 2-Ethyl-2-(hydroxymethyl)-1-3-propanediol | 0.89 | 1.28 |
| 2 | 1 | Pyrrolidinone | 0.79 | 1.11 |

We claim:

1. A dispersant comprising a reaction product of reacting
(i) a di- or polyfunctional isocyanate with
(ii) an HX-terminated polymeric compound, where X is COO, O, S or $NR^1$ and $R^1$ is H or $C_1$–$C_6$-alkyl; and either
(iii) an HY-terminated homopolymer of a monomer selected from the group consisting of N-vinylamides, N-vinyllactams and vinyl- or allyl-substituted nitrogenous heterocycles or copolymer of one or more of the monomers mentioned and optionally further monomers, where Y is COO, O, S or $NR^2$ and $R^2$ is H or $C_1$–$C_6$-alkyl; or
(iv) an HY-functional organic phosphonic ester, where Y is as defined above.

2. A dispersant as claimed in claim 1, wherein the polymeric compound is a polyoxyalkylene glycol monoalkyl ether or a polymer of one or more $C_1$–$C_4$-alkyl methacrylates.

3. A dispersant as claimed in claim 1, wherein the weight average molecular weight of the polymeric compound is within the range from about 250 to 1,000,000.

4. A dispersant as claimed in claim 1, wherein the homo- or copolymer is a homopolymer of a monomer selected from the group consisting of N-vinylpyrrolidone, N-vinylcaprolactam, N-vinylimidazole and N-vinylformamide or a copolymer of one of more of the monomers mentioned.

5. A dispersant as claimed in claim 1, wherein the phosphonic ester is N,N-bis(hydroxyethyl)aminomethyldiethyl phosphonate.

6. A dispersant as claimed in claim 1, wherein the di- or polyisocyanate is an aliphatic diisocyanate or a polyisocyanate containing isocyanurate groups or biuret groups.

7. A method of dispersing at least one pigment, comprising contacting the at least one pigment with the dispersant according to claim 1.

8. A method of preparing an ink, comprising
contacting at least one pigment with the dispersant according to claim 1.

9. A pigment preparation comprising one or more pigments, one or more dispersants as set forth in claim 1 and optionally customary assistants.

10. A method of preparing a toner, comprising
contacting the dispersant according to claim 9 with at least one pigment.

11. An ink for use in inkjet printers, comprising as essential constituents:
(i) an aqueous ink medium,
(ii) one or more pigments, and
(iii) one or more dispersants
as set forth in claim 1.

12. A method for printing substrates by an inkjet printing process, which comprises printing the substrate with the ink as claimed in claim 11.

13. A method of making the dispersant according to claim 1, comprising reacting (i) the di- or polyfunctional isocyanate with (ii) the polymeric compound and at least one member selected from the group consisting of (iii) the HY-terminated homopolymer and (iv) the HY-functional organic phosphonic ester.

14. The method according to claim 7, wherein the pigment a color pigment.

15. The method according to claim 7, wherein the pigment is a magnetic pigment.

16. The method according to claim 8, wherein the ink is an inkjet ink.

17. A method of making the pigment preparation according to claim 9, comprising contacting the one or more pigments with the one or more dispersants.

18. The method according to claim 10, wherein the toner is an aqueous liquid toner.

19. The method according to claim 10, wherein the toner is a pulverulent toner.

20. A method of making the ink according to claim 11, comprising contacting the one or more pigments with the one or more dispersants and an aqueous ink medium.

* * * * *

UNITED STATES PATENT AND TRADEMARK OFFICE
CERTIFICATE OF CORRECTION

PATENT NO. : 6,680,355 B1
DATED : January 20, 2004
INVENTOR(S) : Weingart et al.

It is certified that error appears in the above-identified patent and that said Letters Patent is hereby corrected as shown below:

<u>Title page,</u>
Item [86], the PCT Filing Date, should read:
-- [86]  PCT No.:        PCT/EP99/06915
         § 371 (c)(1),
         (2), (4) Date:  Mar. 14, 2001 --

Signed and Sealed this

Eleventh Day of May, 2004

JON W. DUDAS
*Acting Director of the United States Patent and Trademark Office*